Feb. 1, 1938.     C. B. McCLURE     2,106,929
WATER TEMPERATURE CONTROL VALVE
Filed Feb. 18, 1936
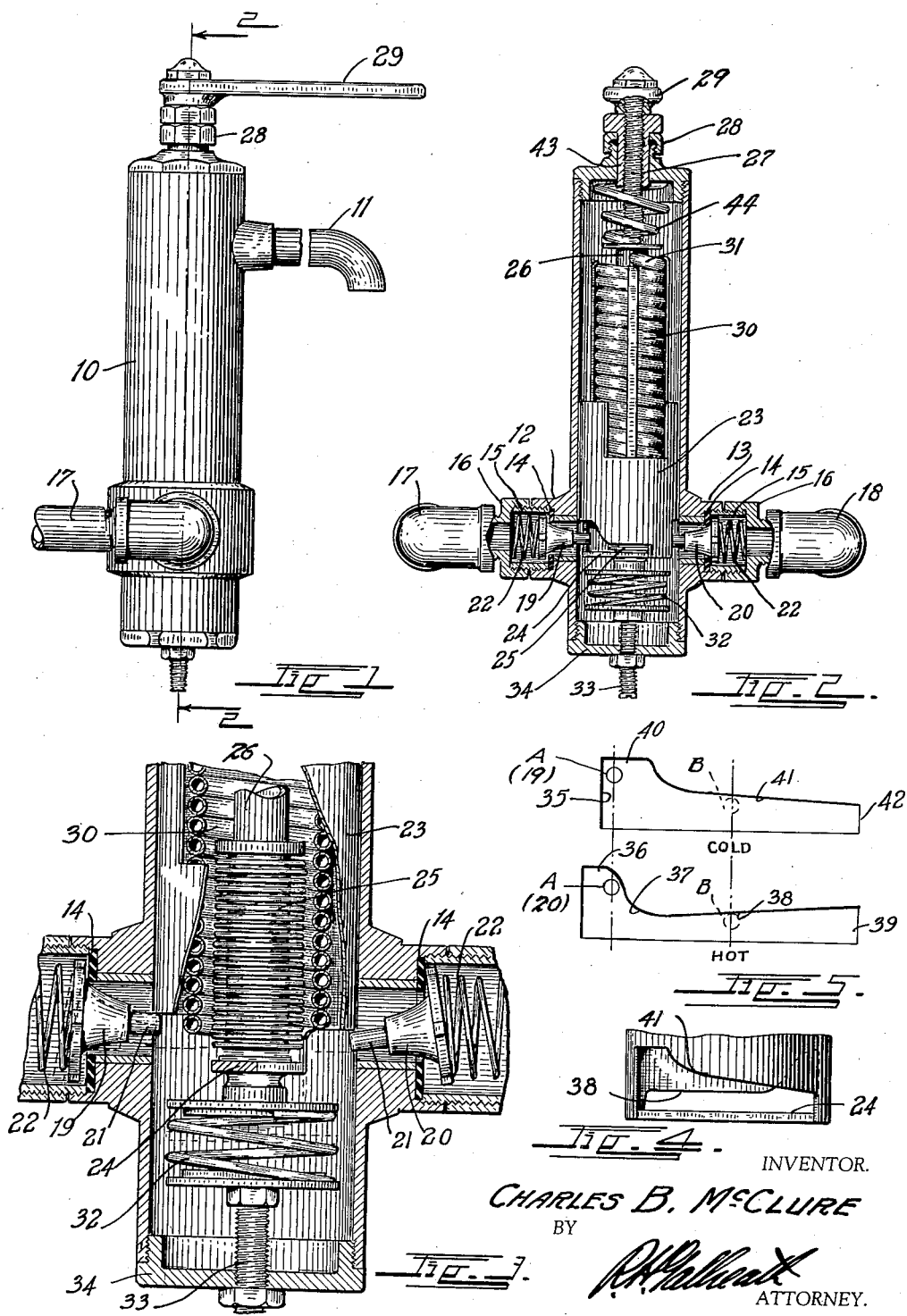
INVENTOR.
CHARLES B. McCLURE
BY
ATTORNEY.

Patented Feb. 1, 1938

2,106,929

UNITED STATES PATENT OFFICE 2,106,929

WATER TEMPERATURE CONTROL VALVE

Charles B. McClure, Denver, Colo., assignor to Lenore L. McClure

Application February 18, 1936, Serial No. 64,505

1 Claim. (Cl. 236—12)

This invention relates to a thermostatically controlled valve, more particularly to a valve for controlling the temperature of the water supply to sinks, lavatories, bath tubs, shower baths, and similar devices.

The principal object of the invention is to provide a mixing valve which can be operated to supply water at any desired temperature and in which, after the desired temperature has been set, the valve will maintain this temperature automatically, regardless of variations in the hot and cold water supplies.

Another object of the invention is to provide an automatically controlled mixing valve that can be also used as a direct combined hot and cold water valve when desired.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 is a side elevation of one form of the improved valve.

Fig. 2 is a vertical section therethrough, taken on the line 2—2, Fig. 1. In this sectional view, the valve and thermostat have not been cut by the section line.

Fig. 3 is an enlarged sectional view through the control portion of the device, illustrating the thermostat construction.

Fig. 4 is a diagram illustrating the relative operation of the hot and cold water valves.

Fig. 5 is a fragmentary detail view of the lower extremity of the valve operating cylinder illustrating the cam surfaces which operate the hot and cold water valves.

The invention comprises a cylindrical housing 10 from which either a discharge pipe or a spout 11 projects. At opposite sides of the housing 10 a cold water coupling or collar 12 and a hot water coupling or collar 13 are positioned to supply the water to the valve. These collars are formed with valve seats upon which valve gaskets 14 are positioned.

The gaskets 14 are held in place by means of short nipples over which caps 16 are threaded. The caps 16 are formed with threaded nipples to receive cold and hot water supply pipes 17 and 18, respectively.

A mushroom-like, cold water valve 19 is seated against the valve gasket 14 in the collar 12 and a similar hot water valve 20 is seated against the gasket 14 in the collar 13. The valves 19 and 20 are formed with inwardly extending stems 21 which extend slightly within the inner circumference of the housing 10. It is preferred to have the stem 21 on the valve 20 slightly shorter than the stem on the valve 19.

The construction of these valves allows them to be tilted from their seats on the gaskets 14 by swinging their stems 21. The valves are constantly urged against their seats by means of compression springs 22, and are swung from their seats by contact with a valve operating sleeve 23 which is slidably and rotatably mounted within the housing 10.

The valve operating sleeve 23 is supported from a cross member 24 extending across its bottom. The cross member 24 is mounted upon the lower extremity of a metallic thermostat bellows 25. The upper extremity of the bellows 25 is secured on a central tube 26 to the upper extremity of which a valve stem 27 is threaded. The valve stem 27 extends through suitable packing nuts 28, and terminates on the exterior of the valve in an operating handle 29.

A metallic coil 30 preferably of copper, surrounds the tube 26, and communicates with its hollow interior, as shown at 31. The lower extremity of the coil is closed. The tube 30 and the bellows 25 are filled with any suitable thermoexpansive fluid which, upon being heated will expand to extend and lengthen the bellows 26, and, upon being cooled will contract to contract or shorten the bellows 25.

The bottom of the bellows 25 and the cross bar 24 which supports the valve operating sleeve 23 are constantly urged upwardly by means of a compression spring 32, the pressure of which can be regulated by means of a set screw 33 threaded through a bottom cap 34 which closes the housing 10. The sleeve is constantly held against the action of the spring by the fluid in the bellows 25.

The lower edge of the valve operating sleeve 23 is cut away to form cam-like surfaces which engage the stems 21 of the valves 19 and 20 to tilt the latter from their seats. The contour of the bottom edge over the hot water valve 20 is indicated in the lower diagram in Fig. 5. This edge is contoured to form a notch 36, from which the edge curves sharply downward to form a low portion 37, thence swings into the almost horizontal straight portion 38, thence returns to the lower edge of the skirt as shown at 39.

The contour of the lower edge over the cold water valve 19, as shown in the upper diagram of Fig. 5. This edge forms a relatively deep notch portion 40 from which the lower edge of the cylinder inclines rather gradually, as shown at 41, to the terminal position where it returns to the lower edge of the skirt as shown at 42. The notches 36 and 40 are diametrically opposite each other as shown in the diagrams of Fig. 5.

Operation

When the valve is in the "off" position, the operating sleeve 23 is turned so that the stems of both valves are in the notches 36 and 40, respectively, as indicated by the circles at "A", Fig. 4, so that the valves are resting undisturbed on their seats.

Let us assume that it is desired to turn only cold water from the spout 11. The handle 29 is turned counter-clockwise (when viewed from above) so as to force the vertical surface 35 against the side of the stem of the valve 19. This rocks this stem to the right and tilts the cold water valve from its seat, allowing the cold water to flow from the pipe 17 upwardly through the housing 10 to the spout 11 without disturbing the hot water valve.

Let us assume that only hot water is desired. The handle 29 is now turned clockwise. This brings the curved surface 37 against the stem of the valve 20, forcing the latter downward so as to tilt the hot water valve 20 from its seat. At this time, the stem of the valve 19 is still resting in the notch 40 so that the cold water valve has not been opened.

Let us now assume that a mixture of hot and cold is desired. The handle 29 is turned still further so as to position both the valve stems at the desired intermediate position such as indicated at "B". At this time, both the hot water and the cold water are on, the hot being substantially wide open and the cold, since the latter has not reached the extreme low position on the inclined surface 41, being only partially open. Therefor, a greater portion of hot water is flowing into the housing than of cold. Should more cold be desired, the handle is turned further to the left, this further opens the cold water valve and further closes the hot water valve. Should hotter water be desired, the handle is turned to the right to cause the cold water valve to swing toward the closed position and to further open the hot water valve.

Assuming that the position "B" gives the desired temperature to the delivered water, the operator can rest assured that this temperature will be maintained for, should the hot water supply be increased for any reason, it will heat the fluid in the coil 30, causing it to expand the bellows 25. This pushes the entire sleeve 23 downwardly, as indicated in broken line in Fig. 3. In moving downwardly, the sleeve will push the stem 21 of the cold water valve 19 further down, admitting more cold water to offset the increased temperature of the hot water. Since the hot water valve is substantially wide open, it can not be further opened by this downward movement, and the only result on the hot water side is that the stem 21 of the hot water valve 20 allows the sleeve 23 to move past it on its way downward, still retaining the open position.

Let us now assume that the hot water supply lessens or looses temperature so as to lower the temperature of the water in the housing 10. This immediately results in a partial closing of the cold water valve while still allowing the hot water to remain open.

Therefor, it can be readily seen that the device will constantly maintain a preset temperature in the water exiting from the spout 11.

If desired, a pipe may be connected in place of the spout 11, and carried to any desired control faucet by means of which the amount of water flowing can be regulated. In this case, the present invention is employed simply as a mixing and temperature control valve, whereas the added valve would act as the flow control valve.

It is conceivable that the shape of the valves 19 and 20 could be altered to meet manufacturing requirements. For instance, they could be simple ball valves with the inner faces of the balls contacting the lower edge of the skirt 23.

It is preferred to thread the shaft 27 into a tubular nut 43, which in turn is sealed by the packing nut 28. By rotating the tubular nut 43, the shaft 27 and its supporting mechanism can be raised or lowered to adjust the proper contact with the valves 19 and 20. It is preferred to place an upper spring 44 above the thermostatic coil to constantly force the sleeve 23 downwardly and hold the same against movement. This spring could be eliminated, but it allows adjusting movement of the sleeve by means of the nut 43.

While a specific form of the improvement has been described and illustrated herein, it is desired to be understand that the same may be varied, within the scope of the appended claim, without departing from the spirit of the invention.

Having thus described the invention, what is claimed and desired secured by Letters Patent is:—

A thermostatically controlled mixing valve, comprising a housing, hot and cold water inlets to the housing, valves in said inlets, valve operating means on said valves extending into said housing, a sleeve in said housing, a thermostat moving said sleeve axially, cams on said sleeve adapted to engage said valve operating means, one of said cams adapted throughout a range of adjustment to maintain one of said valves fully open at all times, the other of said cams adapted to maintain said other valve partly open, means for rotating said sleeve to initially set said valves, said thermostat moving said sleeve to maintain a predetermined temperature by regulating said partly open valve, said cams being so formed that either valve may be independently fully opened at will.

CHARLES B. McCLURE.